Figure 1:
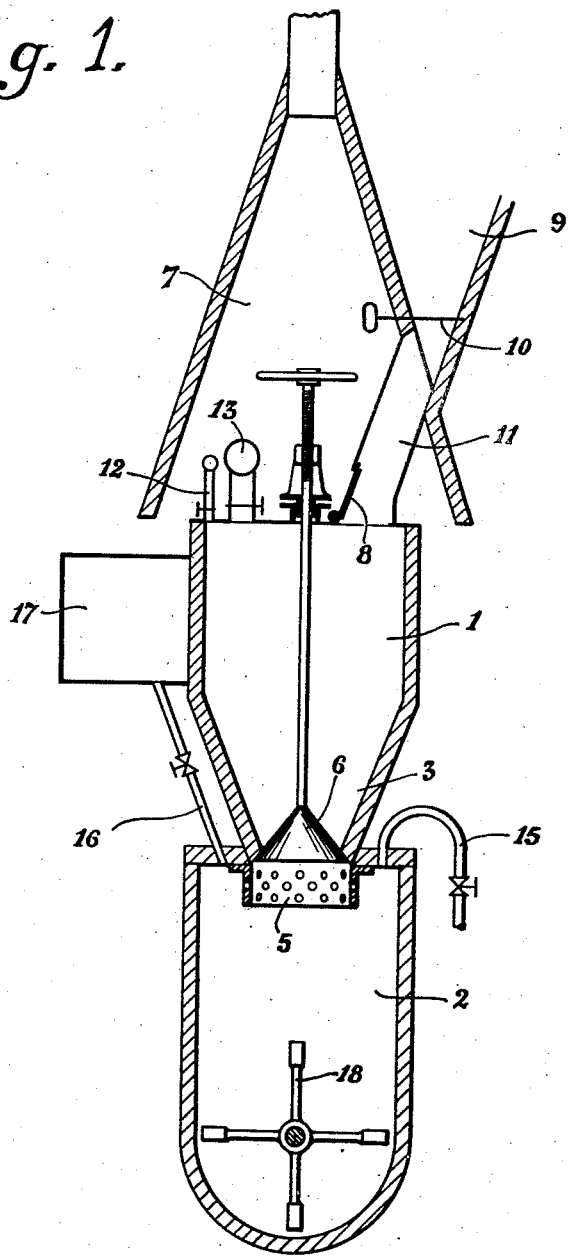

Sept. 10, 1929.  F. PARENTANI  1,727,441
PROCESS OF PURIFYING CLAY AND LIKE MATERIALS
Filed Nov. 10, 1926   2 Sheets-Sheet 1

Inventor:
Fernand Parentani

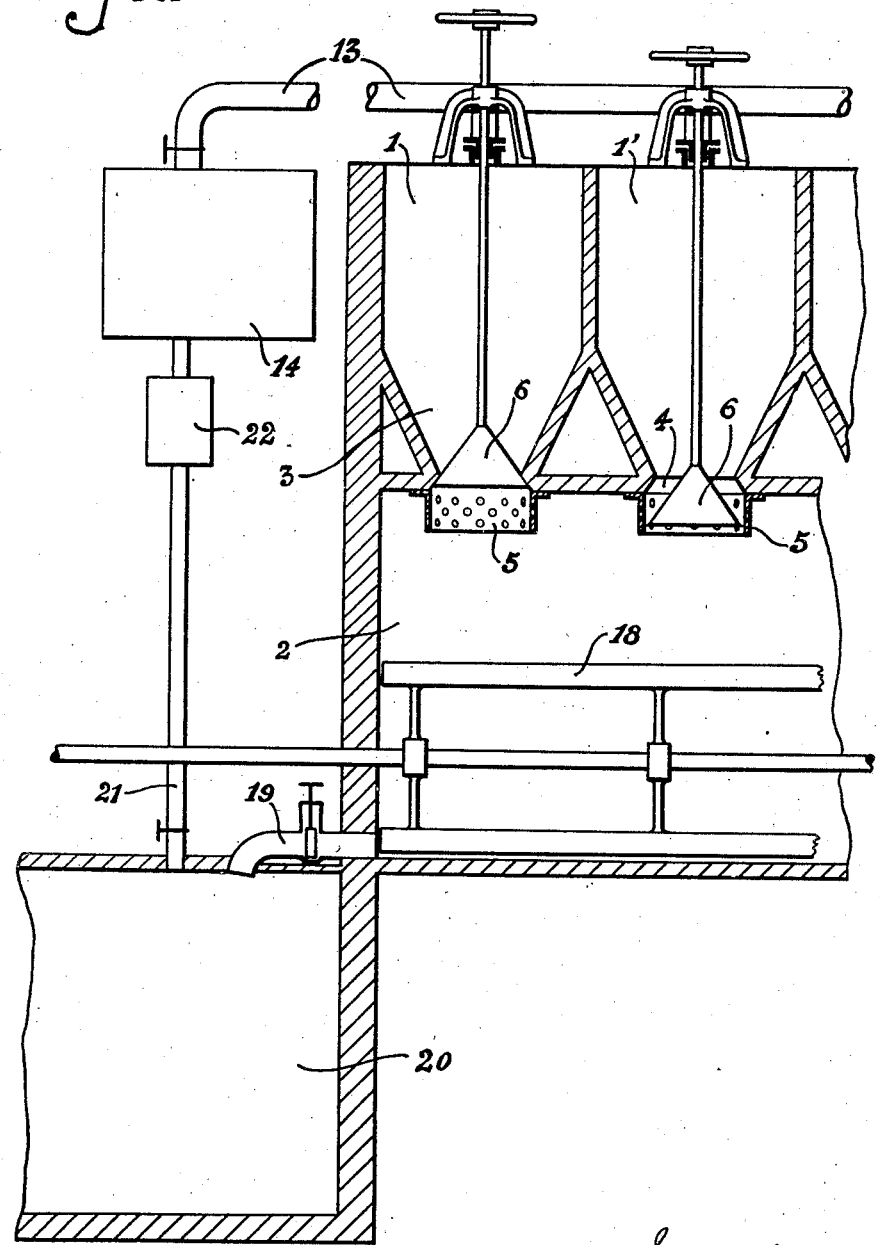

Patented Sept. 10, 1929.

1,727,441

UNITED STATES PATENT OFFICE.

FERNAND PARENTANI, OF BRUSSELS, BELGIUM.

PROCESS OF PURIFYING CLAY AND LIKE MATERIALS.

Application filed November 10, 1926, Serial No. 147,539, and in Belgium November 18, 1925.

The present invention relates to the treatment of clay and like earths or rocks with a view to eliminating therefrom the colouring salts and in particular iron oxide whose presence frequently renders these materials unsuitable for use in various industries, as the ceramic industry. These salts are usually unaffected or only incompletely attacked by the usual solvents and the processes which give more successful results have proved to be very costly.

According to this invention I obtain the desired results in a very simple and economical manner by subjecting the clay or earth in the dry state and at atmospheric temperature to the action first of a vacuum and then of gaseous sulphuretted hydrogen. The oxides and other colouring salts throughout the mass of material are thus converted into sulphides which can be dissolved in acidulated water in a well known manner. The sulphuretted hydrogen evolved in the course of the dissolution may be recovered and used for the treatment of further charges of material.

Although in aqueous solution sulphuretted hydrogen only imperfectly attacks the colouring salts present in clay I have found that when used in the gaseous state and in the absence of water after the material has been subjected to a vacuum it acts with a surprising efficacy at atmospheric temperature, thoroughly penetrates the mass and converts into sulphides the salts most refractory to wet treatments. The vacuum treatment as a preliminary to the sulphidizing step is of great importance as I thus avoid the immediate oxidation of the sulphides by the air contained in the mass, which oxidation is accompanied by the liberation of sulphur in a very divided state which pollutes the material and escapes further treatment. This inconvenience I have found is entirely eliminated by my improved process and a practically complete sulphidization is obtained in a very short time. Thus, for example, a clay containing 5, 14% of $Fe_2O_3$ subjected for 8 hours to the action of gaseous sulphuretted hydrogen, then treated with a 5% solution of sulphuric acid, diluted with water and filtered, contained only 0.26%, i. e. a quite negligible amount, of $Fe_2O_3$.

In carrying out this process care should be taken to avoid as much as possible any loss of toxic gas through leakage. To this end, according to my invention, the sulphuration and dissolution receptacles are preferably so arranged that the sulphuretted hydrogen evolved while one or more charges are being dissolved is directly led to a chamber containing a new charge of earth. Thus the regenerated gaseous reagent is used over and over again and it is only required to add from time to time a small quantity of sulphuretted hydrogen to compensate for any losses.

In order more fully to explain the sequence of operations I have illustrated by way of example, in the accompanying drawings, an apparatus for carrying out my improved process.

In the drawings Figs. 1 and 2 are two vertical sections made respectively on line A—B of Fig. 2 and line C—D of Fig. 1.

The apparatus shown comprises a series or sulphuration chambers or receptacles 1, 1'... adapted to be hermetically closed, and arranged above a trough or vat 2 also hermetically closed, in which dissolution is to take place. The lower part 3 of the receptacles 1, 1'... is tapered downwardly and provided at the bottom with an opening 4 communicating with the vat 2 through a perforated tube 5. This opening is normally closed by a valve 6.

The receptacles 1, 1'... are arranged under a hood 7 and they are provided each with a charging door 8. The hood 7 is a part of a structure comprising feeding hoppers 9 connected each with one of the receptacles 1, 1'... through a chute 11 provided with a slide valve 10. In its open position shown in Fig. 1, the door 8 has a gas-tight fit against the upper wall of the chute 11 in order to avoid gas losses when charging.

The first receptacle 1 being filled with clay in blocks or pieces, previously dried if necessary, the air contained therein is sucked through a pipe 12 connected with a suitable vacuum pump and gaseous sulphuretted hydrogen from a container 14 is introduced through a pipe 13. This gas is allowed to react for a few hours on the dry mass of clay, the duration of this treatment depending on the amount and the nature of the colouring matter in the clay. The valve 6 is then lowered in order to allow the sulphurated mass to drop from the receptacle 1 into the vat 2. Water is supplied to said vat through a pipe 15 and a small quantity of a suitable acid, for instance sulphuric acid from a container 17, is introduced through a pipe 16. The valve 6 being closed a stirring device 18 is set into motion.

In the meantime the receptacle 1' has been charged, its door 8 closed and vacuum applied thereto through its pipe 12. The valve 6 of this receptacle is then lowered in the perforated tube 5, as shown in Fig. 2. The sulphuretted hydrogen produced by the action of sulphuric acid on the sulphides previously formed within the clay, escapes through the perforations of the tube 5 into the chamber 1' where it immediately attacks the iron oxide and other colouring salts contained in the fresh charge.

When the dissolution of the sulphides is completed in the vat 2 the mass is allowed to flow through a pipe 19 into a tank 20 having a connection 21 with a vacuum pump 22 which is then set in operation. Under the reduced pressure the sulphuretted hydrogen which was dissolved in the solution is extracted therefrom and sent by the pump 22 to the container 14. The mass is then diluted with water as usual and sent to the filter-press.

By alternately charging three or four sulphuration receptacles I am enabled to carry out this process in a continuous manner and reduce as much as possible the losses in sulphuretted hydrogen.

The gaseous sulphuretted hydrogen may be used under any suitable pressure and it is understood that changes may be made in the manner of operating, and in the construction of, the apparatus described without departing from the scope of this invention.

I claim:

1. A process of purifying clay and like argillaceous materials, which comprises extracting the air contained therein, subjecting the material in a dry state to the action of gaseous sulphuretted hydrogen at atmospheric temperature, dissolving the sulphides formed and separating the material therefrom.

2. A process of purifying clay and like argillaceous materials, which comprises subjecting the material to a vacuum, treating it with gaseous sulphuretted hydrogen at atmospheric temperature and in the absence of water, dissolving the sulphides formed and separating the material from the solution.

3. A process of purifying clay and like argillaceous materials, which comprises subjecting the material in a dry state and at atmospheric temperature to the action first of a vacuum and then of gaseous sulphuretted hydrogen, then treating it with an acid solution adapted to decompose the sulphides formed and dissolve their solid constituents, and causing the sulphuretted hydrogen evolved in the course of this treatment to act on a fresh charge of material.

4. A process of purifying clay and like argillaceous materials, which comprises charging the material in a dry state into gastight receptacles, successively subjecting the material in each receptacle to a vacuum, admitting gaseous sulphuretted hydrogen into one of said receptacles, discharging the material from said receptacle into an acid solution adapted to decompose the sulphides formed and dissolve their solid constituents, admitting the sulphuretted hydrogen evolved from said solution into another of said receptacles, and successively discharging the contents of each receptacle into said solution after having admitted therein the sulphuretted hydrogen evolved in the course of the treatment of a preceding charge.

5. In a process of purifying clay and like argillaceous materials according to claim 4, subjecting to a vacuum the spent solution with the insoluble material mixed therewith, recovering the sulphuretted hydrogen evolved therefrom, diluting said solution with water, and separating the insoluble material therefrom.

In testimony whereof I have affixed my signature.

FERNAND PARENTANI.